W. P. JUDGE.
SEAT SPRING.
APPLICATION FILED SEPT. 25, 1915.
1,223,494.
Patented Apr. 24, 1917.
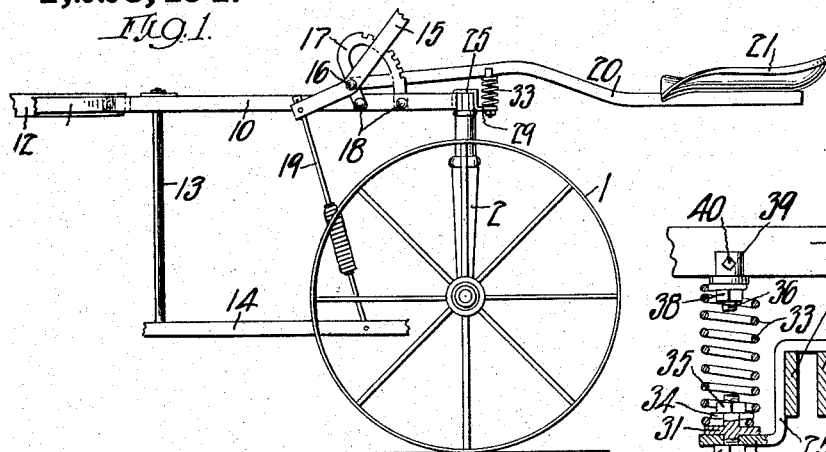
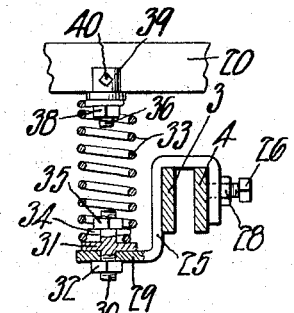
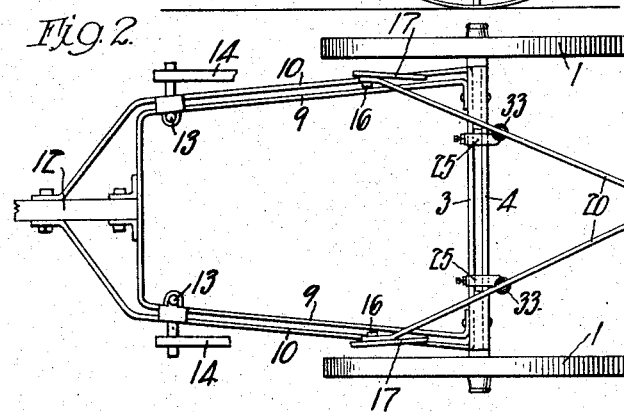
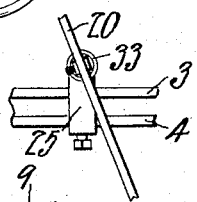
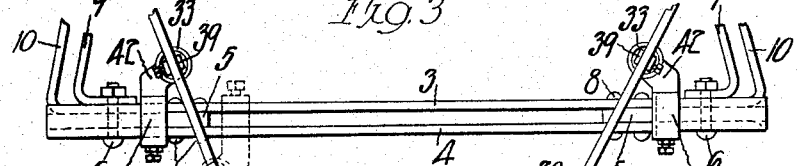
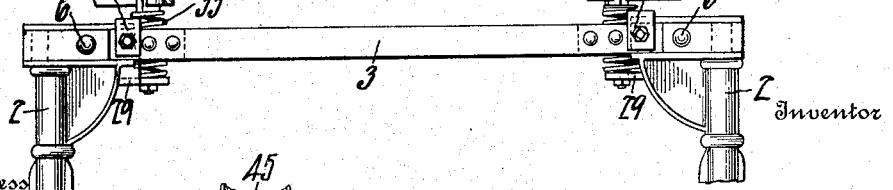
Witness
Inventor
William P. Judge,
By Pagelsen & Spencer
Attorneys Figures.

UNITED STATES PATENT OFFICE.

WILLIAM P. JUDGE, OF DETROIT, MICHIGAN.

SEAT-SPRING.

1,223,494.   Specification of Letters Patent.   Patented Apr. 24, 1917.

Application filed September 25, 1915. Serial No. 52,550.

*To all whom it may concern:*

Be it known that I, WILLIAM P. JUDGE, a citizen of the United States, residing at Detroit, in the county of Wayne and State of Michigan, have invented a new and useful Seat-Spring, of which the following is a specification.

The present invention has reference to a spring construction for the seats of riding cultivators and similar agricultural implements, and among its objects are the provision of a quickly detachable spring construction which may be applied to the axles and seat bars of implements now on the market, and to provide a reversible spring support by which the point of contact of the spring with the seat bar, and consequently the effective leverage of the seat bars in respect to the spring, may be varied to suit the weight of the driver. The invention consists in combination with a spring arranged between the seat bars and the axle, of a spring support adapted to embrace axles of various forms and to be secured thereto in reverse positions whereby its effective leverage on the seat bars is varied to accord with the weight of the user. It also consists in the details of construction shown, described and claimed.

In the drawings, Figure 1 is a side view, parts being broken away, showing the application of the invention to a well known form of cultivator. Fig. 2 is a plan view corresponding to Fig. 1. Fig. 3 is a fragmentary plan view of a portion of the axle and adjacent parts on a larger scale, the spring being reversed. Fig. 4 is a rear elevation, parts being broken away, showing the members which appear in Fig. 3, together with portions of the end pieces of the axle. Fig. 5 is a transverse section through the axle and spring. Fig. 6 is a fragmentary plan view of a modification.

Similar reference characters refer to like parts throughout the several views.

Referring to Figs. 1 to 5, inclusive, 1 indicates the wheels upon which is mounted a U-shaped axle comprising the substantially vertical end pieces 2 and the cross bars 3 and 4 (between which a tongue 5, that may be adjusted transversely in respect to the corresponding member 2 by bolts 6, is rigidly secured at each end by rivets 8). The bolts may also extend through the longitudinal bars 9 and 10 that together constitute the main framework of the vehicle and which are secured at their forward end to the tongue 12 in any desired manner. Supported from the frame at a point somewhat forward of the axle are the suspension rods 13 upon which is carried a sub-frame 14 to which the teeth or other working elements of the machine (not shown) are secured. A hand lever 15, pivoted at 16 to a segment 17 that is rigidly attached to the frame by rivets 18, together with a spring link 19, serves in an obvious manner to adjust the depth of cut of the working tools. Also pivoted to the frame, for example, at the points 16, are the rearwardly converging seat bars 20, which extend backwardly over the axle and support the seat 21. The several features thus far described are old and well known.

The cross bars 3—4 are embraced at each side by spring-supporting brackets 25, each of which includes a set-screw 26 and lock-nut 28 and has a perforated shelf portion 29, the latter of which receives a bolt 30 which is preferably provided with a collar 31 formed integrally therewith, and is clamped rigidly to the shelf portion by a nut 32. The upper end of the bolt extends into the lower end of a spiral spring 33 and a washer 34 and nut 35 secure the latter in position thereon. At its upper end the spring is provided with a bolt 36 and nut 38, the former of which has a divided upper end 39 that may be clamped to the corresponding seat bar 20 by means of the set-screw 40.

It will be seen that the parts 25 to 40 inclusive may be bought on the market and applied to the existing cultivator construction; and this application may take place in either the manner shown in full lines in Fig. 3 or that appearing in dashed lines. When in the former position the seat is adapted for use by a boy or other driver of light weight. When, however, the spring is reversed, the effective leverage of the seat bars upon it is much reduced and the seat may be used by a heavy man.

Because of the rivets 6, it is preferred to offset the shelf portion 29 in the manner indicated at 42 in Fig. 3; this arrangement allows the reversal of the parts as shown in dotted lines and brings the axis of the spring in alinement with the corresponding seat bar 20 without interfering with the rivet heads in any way, thus affording a much more secure clamping effect than would be otherwise obtained. In those cases in which the rivets 6 or other obstructions are not present, the off-setting of the shelf may be dispensed with, as is indicated in Fig. 6. It will be understood that the operator rests his feet on the foot brackets 45 in the usual manner.

Various changes may be made in the details of the construction without departing from the spirit of my invention; for example, the brackets 25 and the end 39 of the bolt 36 may be formed, respectively, to fit axles and seat bars, the cross-sections of which are different from those shown. And while the invention has been shown adapted to an agricultural implement, certain of its features are obviously applicable to vehicles generally. I do not, therefore, wish to be limited otherwise than as indicated by the subjoined claims.

I claim:—

1. A vehicle comprising an axle, a frame extending forwardly of the axle, a seat bar pivotally supported on the frame at a point forward of the axle, said seat bar extending rearwardly of the axle and having a seat on its rear end, a detachable bracket secured to the axle, and a spring carried by said bracket and interposed between it and the seat bar, said bracket being reversible on the axle from a position in which the spring is forward of the axle to a position in which it is rearward of the axle, whereby the leverage of the seat bar on the spring may be varied.

2. A vehicle comprising an axle, a frame extending forwardly of the axle, a seat bar pivotally supported on the frame at a point forward of the axle, said seat bar extending above and rearwardly of the axle and having a seat on its rear end, a detachable bracket secured to the axle, and a spring carried by said bracket and interposed between it and the seat bar, said bracket being reversible on the axle from a position in which the spring is forward of the axle to a position in which it is rearward of the axle, whereby the leverage of the seat bar on the spring may be varied.

3. A vehicle comprising an axle, a frame extending forwardly of the axle, a seat bar pivotally supported on the frame at a point forward of the axle, said seat bar extending rearwardly of the axle and having a seat at its rear end, a detachable bracket secured to the axle, said bracket having a projecting portion, a spring attached at one end to the projecting portion and having its other end secured to the seat bar said bracket being reversible on the axle from a position in which the projecting portion of the bracket is forward of the axle to a position in which it is rearward of the axle, whereby the leverage of the seat bar on the spring may be varied.

4. A vehicle comprising an axle, a frame extending forwardly of the axle, a seat bar pivotally supported on the frame at a point forward of the axle, said seat bar extending rearwardly of the axle and crossing the latter at an acute angle and having a seat on its rear end, a detachable bracket secured to the axle, and a spring carried by said bracket and interposed between it and the seat bar, said bracket being reversible on the axle from a position in which the spring is forward of the axle to a position in which it is rearward of the axle, whereby the leverage of the seat bar on the spring may be varied.

5. A vehicle comprising an axle, a frame extending forwardly of the axle, a seat bar pivotally supported on the frame at a point forward of the axle, said seat bar extending above and rearwardly of the axle and having a seat at its rear end, a detachable bracket extending over and embracing the axle, a spring carried by the bracket, divided means at the upper end of the spring for embracing the seat bar, and means for securing the divided means to the seat bar, said last mentioned means allowing the divided means to be adjusted longitudinally of the bar.

6. A vehicle comprising an axle, a frame extending forwardly of the axle, a seat bar pivotally supported on the frame at a point forward of the axle, said seat bar extending rearwardly of the axle and crossing the latter at an acute angle and having a seat on its rear end, a detachable bracket secured to the axle, and a spring carried by said bracket and interposed between it and the seat bar, said bracket being reversible on the axle from a position in which the spring is forward of the axle to a position in which it is rearward of the axle, whereby the leverage of the seat bar on the spring may be varied, the bracket, when in one of the positions stated, being nearer the end of the axle than when in the other position.

7. A vehicle comprising an axle, a frame extending forwardly of the axle, seat bars pivotally supported on the frame at a point forward of the axle, said seat bars extending rearwardly of the axle and having a seat at their rear ends, brackets secured to the axle, helical compression springs each rigidly secured at one of its ends to the corresponding bracket, the other ends of said springs being secured to the corresponding seat bar, said springs constituting the sole direct connection between the axle and the seat bars.

In testimony whereof I sign this specification.

WILLIAM P. JUDGE.